United States Patent
Chandra et al.

(10) Patent No.: US 10,913,020 B2
(45) Date of Patent: Feb. 9, 2021

(54) MAGNETIC INTERFACE FOR A WATER FILTER ASSEMBLY

(71) Applicant: Haier US Appliance Solutions, Inc., Wilmington, DE (US)

(72) Inventors: Sharath Chandra, Hyderabad (IN); Naresh Suthar, Hyderabad (IN); Gregory Sergeevich Chernov, Louisville, KY (US); Koncha Chandra Sekhar, Hyderabad (IN); Allamneni Naga Tejaswini, Hyderabad (IN); Syed Moin Ahmed, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 282 days.

(21) Appl. No.: 15/980,944

(22) Filed: May 16, 2018

(65) Prior Publication Data

US 2019/0351354 A1 Nov. 21, 2019

(51) Int. Cl.
| | |
|---|---|
| *B01D 35/30* | (2006.01) |
| *B01D 29/15* | (2006.01) |
| *F25D 17/02* | (2006.01) |
| *C02F 9/00* | (2006.01) |
| *C02F 1/00* | (2006.01) |
| *B01D 35/06* | (2006.01) |

(52) U.S. Cl.
CPC ........... *B01D 35/306* (2013.01); *B01D 29/15* (2013.01); *F25D 17/02* (2013.01); *B01D 2201/30* (2013.01); *B01D 2201/4069* (2013.01); *F25D 2317/00* (2013.01)

(58) Field of Classification Search
CPC .. B01D 35/306; B01D 29/15; B01D 2201/30; B01D 2201/4069; F25D 17/02; F25D 2317/00
See application file for complete search history.

(56) References Cited

U.S. PATENT DOCUMENTS

| | | | | |
|---|---|---|---|---|
| 5,251,362 | A  * | 10/1993 | Riceman | H01F 7/0263 24/303 |
| 6,295,702 | B1 * | 10/2001 | Bauer | A45C 13/1069 24/303 |
| 6,632,355 | B2 | 10/2003 | Fritze | |
| 7,506,666 | B2 | 3/2009 | Tubby et al. | |
| 7,836,708 | B2 | 11/2010 | Krause et al. | |
| 8,177,973 | B2 | 5/2012 | Kennedy et al. | |
| 8,182,699 | B2 | 5/2012 | Fritze | |
| 9,011,686 | B2 | 4/2015 | Kirchner et al. | |
| 10,603,612 | B2 * | 3/2020 | Chandra | B01D 29/15 |
| 2009/0173683 | A1 * | 7/2009 | Burrows | B01D 61/025 210/234 |

(Continued)

FOREIGN PATENT DOCUMENTS

| | | |
|---|---|---|
| CN | 202212062 U | 5/2012 |
| CN | 203790657 U | 8/2014 |
| KR | 20000074968 A | 12/2000 |

*Primary Examiner* — Bradley R Spies
*Assistant Examiner* — Jeannie McDermott
(74) *Attorney, Agent, or Firm* — Dority & Manning, P.A.

(57) ABSTRACT

A water filter assembly is provided that includes features that facilitate mounting and removal of a water filter cartridge to and from a manifold. In particular, the water filter assembly includes a magnetic interface that simplifies and aids mounting and removal of the water filter cartridge to and from the manifold.

17 Claims, 13 Drawing Sheets

(56) References Cited

U.S. PATENT DOCUMENTS

| | | | |
|---|---|---|---|
| 2010/0018912 A1* | 1/2010 | Wawrla | C02F 9/005 210/101 |
| 2015/0114895 A1* | 4/2015 | Kruckenberg | B01D 35/306 210/232 |
| 2017/0088305 A1* | 3/2017 | Jacob | B65D 41/0407 |

* cited by examiner

MAGNETIC INTERFACE FOR A WATER FILTER ASSEMBLY

FIELD OF THE INVENTION

The present subject matter relates generally to water filter assemblies, such as water filter assemblies for refrigerator appliances.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filter media, such as an activated carbon block. The water filter's filter media can adsorb or remove contaminants such as chlorine and lead from water prior to delivering such water to a user. For example, the water filter can filter water prior to such water entering the refrigerator's ice maker or water dispenser.

The activated carbon block has pores that permit a flow of water therethrough. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filter media has not exceeded its filtering capacity, the water filter is preferably replaced or serviced about every six months regardless of its current performance. Removing and installing water filters can be messy and time consuming tasks. For example, when the water filter is removed from a manifold, the water filter is typically filled with water and such water can spill if the water filter is tipped or tilted during removal. However, tipping or tilting certain water filters can be required in order to remove certain water filters due to their location. Such spills can be time consuming and inconvenient to clean. Thus, certain consumers only replace their water filters long after the useful service life of their filters.

Accordingly, a water filter assembly that addresses one or more of the challenges noted above would be useful.

BRIEF DESCRIPTION OF THE INVENTION

Aspects and advantages of the invention will be set forth in part in the following description, or may be apparent from the description, or may be learned through practice of the invention.

In one exemplary embodiment, a water filter assembly is provided. The water filter assembly includes a manifold defining a first slot and a second slot. The first slot having an opening and a recessed groove and the second slot having an opening and a recessed groove. The water filter assembly further includes a first magnet disposed within the recessed groove of the first slot and a second magnet disposed within the recessed groove of the second slot. Moreover, the water filter assembly includes a filter cartridge removably mounted to the manifold and defining a chamber, the filter cartridge comprising a housing. In addition, the water filter assembly includes a filter media disposed within the chamber. The water filter assembly also includes a first magnetic member extending from the housing, wherein when the filter cartridge is mounted to the manifold, the opening of the first slot receives the first magnetic member and the first magnetic member is attracted to the first magnet. The water filter assembly further includes a second magnetic member extending from the housing. Wherein when the filter cartridge is mounted to the manifold, the opening of the second slot receives the second magnetic member and the second magnetic member is attracted to the second magnet.

In another exemplary embodiment, a water filter assembly defining an axial direction, a radial direction, and a circumferential direction extending about the axial direction is provided. The water filter assembly includes a manifold comprising a bottom wall and defining a first slot and a second slot each extending along the circumferential direction, the first slot spaced from the second slot along the circumferential direction, the first slot having an opening defined by the bottom wall and a recessed groove, the second slot having an opening defined by the bottom wall and a recessed groove. The water filter assembly also includes a first magnet disposed within the recessed groove of the first slot and a second magnet disposed within the recessed groove of the second slot. Further, the water filter assembly includes a filter cartridge removably mounted to the manifold and defining a chamber, the filter cartridge comprising a housing. In addition, the water filter assembly includes a filter media disposed within the chamber. Moreover, the water filter assembly includes a first magnetic member comprising a first portion and a second portion, the first portion extending from the housing along the axial direction and the second portion extending from the first portion along a direction substantially orthogonal to the axial direction, wherein when the filter cartridge is mounted to the manifold, the opening of the first slot receives the first magnetic member, the recessed groove of the first slot receives the second portion of the first magnetic member, and the first magnetic member is attracted to the first magnet. The water filter assembly also includes a second magnetic member comprising a first portion and a second portion, the first portion extending from the housing along the axial direction and spaced from the first magnetic member along the circumferential direction, the second portion of the second magnetic member extending from the first portion of the second magnetic member along the direction substantially orthogonal to the axial direction. Wherein when the filter cartridge is mounted to the manifold, the opening of the second slot receives the second magnetic member, the recessed groove of the second slot receives the second portion of the second magnetic member, and the second magnetic member is attracted to the first magnet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
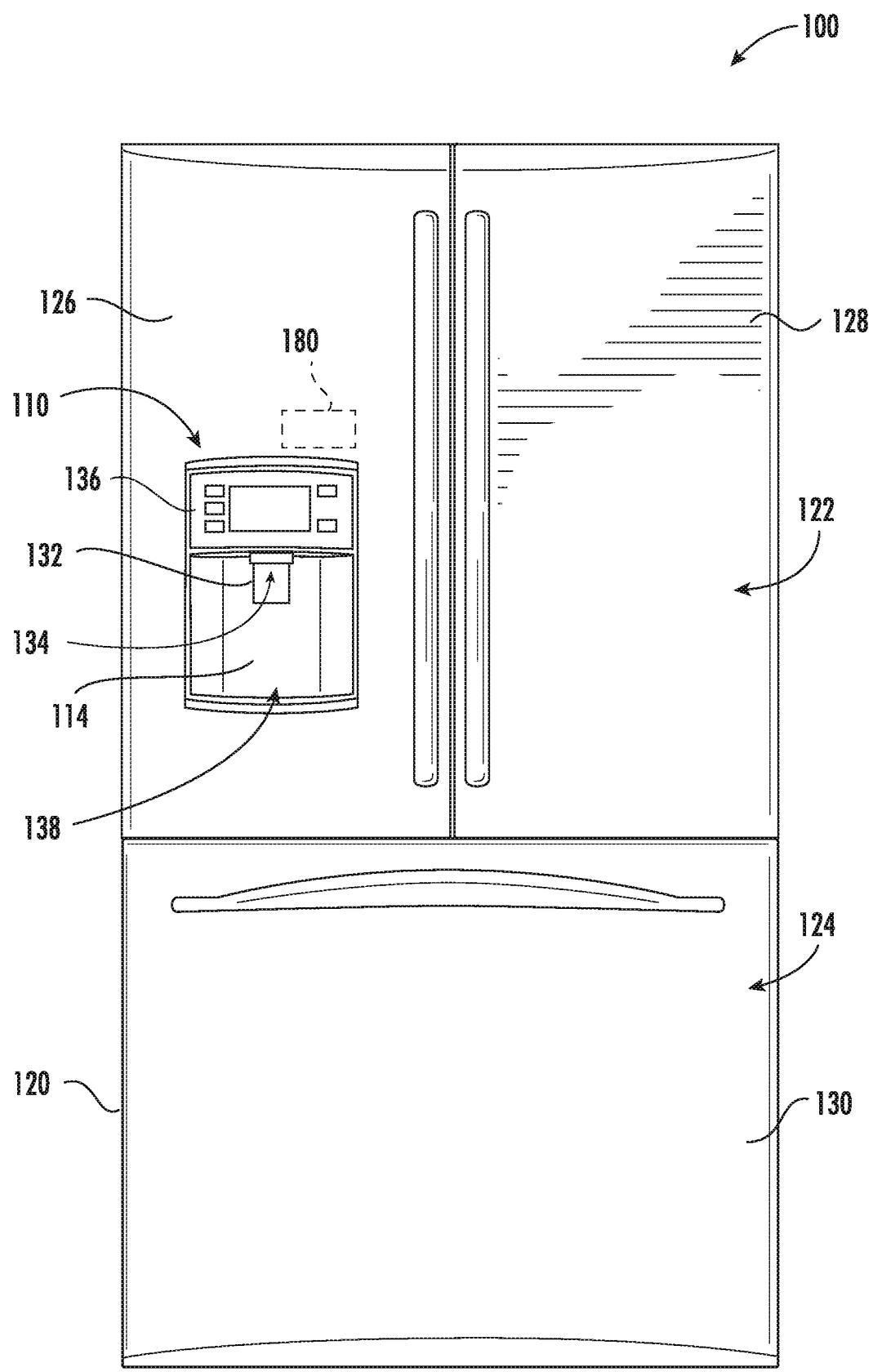
FIG. 1 provides a front, elevation view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In the exemplary embodiment, housing 120 also defines a mechanical compartment (not shown) for receipt of a sealed cooling system. Using the teachings disclosed herein, it will be understand that the present subject matter can be used with other types of refrigerators (e.g., side-by-sides, top mounts, etc.). Thus, the description set forth herein is provided by way of example only and is not intended to limit the present subject matter to any particular arrangement or placement within an appliance.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access freezer chamber 124. In the exemplary embodiment, recessed portion 138 is positioned at a level that approximates the chest level of a user.

Figure 2:
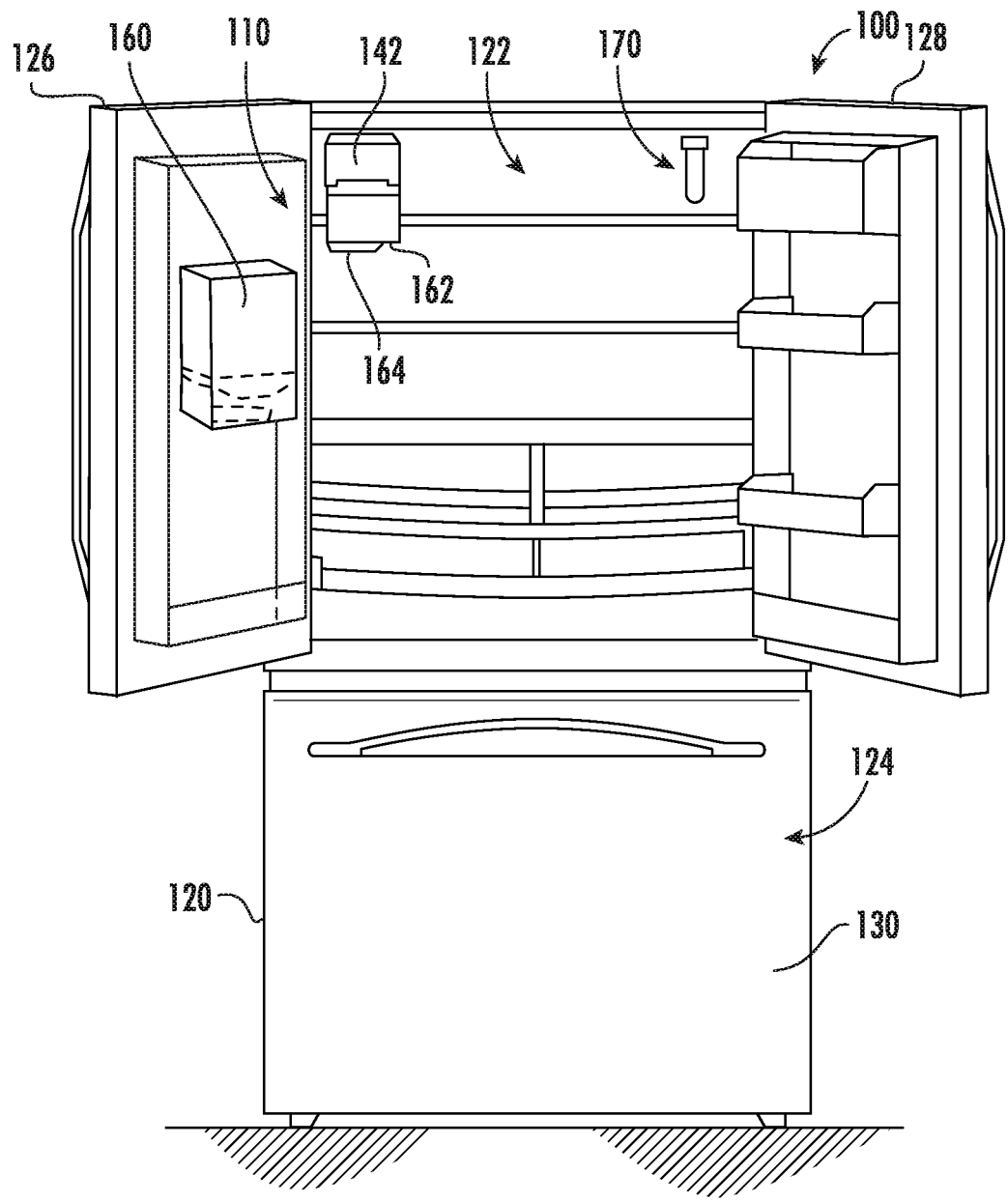
FIG. 2 provides a front, elevation view of the refrigerator appliance of FIG. 1 with refrigerator doors of the refrigerator appliance shown in an open configuration to reveal a fresh food chamber of the refrigerator appliance.

FIG. 2 provides a front perspective view of refrigerator appliance 100 having refrigerator doors 126, 128 in an open position to reveal the interior of fresh food chamber 122. As such, certain components of dispensing assembly 110 are illustrated. Dispensing assembly 110 includes an insulated housing 142 mounted within refrigerator chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. More particularly, insulated housing 142 contains an ice maker for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As door 126 is closed or opened, receptacle 160 is moved in and out of position under insulated housing 142.

In an alternative exemplary embodiment, insulated housing 142 and its ice maker can be positioned directly on door 126. In still another exemplary embodiment, the ice maker could be located on the door for the freezer compartment and directly over receptacle 160, e.g., in a configuration where the fresh food compartment and the freezer compartment are located side by side (as opposed to over and under as shown in FIGS. 1 and 2). As such, the use of an insulated housing would be unnecessary. Other configurations for the location of receptacle 160, an ice maker, and/or insulated housing 142 may be used as well.

Referring again to FIG. 1, operation of the refrigerator appliance 100 is regulated by a controller 180 that is operatively coupled to user interface panel 136 and/or activation member 132. Panel 136 provides input selectors for user manipulation of the operation of refrigerator appliance 100 such as e.g., selections between whole or crushed ice, chilled water, and/or other options as well. In response to user manipulation of the user interface panel 136, the controller 180 operates various components of the refrigerator appliance 100. The controller 180 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller 180 may be positioned in a variety of locations throughout refrigerator appliance 100. For example, the controller 180 may be located beneath the user interface panel 136 on door 126. Alternatively, as shown in FIG. 1, controller 180 may be positioned proximate user interface panel 136 on door 126. In some embodiments, input/output ("I/O") signals may be routed between the controller 180 and various operational components of refrigerator appliance 100. In some exemplary embodiments, the user interface panel 136 may represent a general purpose I/O ("GPIO") device or functional block. In other exemplary embodiments, the user interface 136 may include input components, such as one or more of a variety of electrical, mechanical or electro-mechanical input devices including rotary dials, push buttons, and touch pads. The user interface 136 may be in communication with the controller 180 via one or more signal lines or shared communication busses.

With reference again to FIG. 2, refrigerator appliance 100 also includes a water filter assembly 170 for filtering water coming into refrigerator appliance 100 from a water supply (not shown), such as a municipal water source or a well. Water filter assembly 170 can remove contaminants, such as chlorine, chloroform, lead, arsenic, pharmaceuticals, microbes, etc., from water supplied to refrigerator appliance 100. In particular, water filter assembly 170 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics and other chemical compounds or substances.

Figure 3:
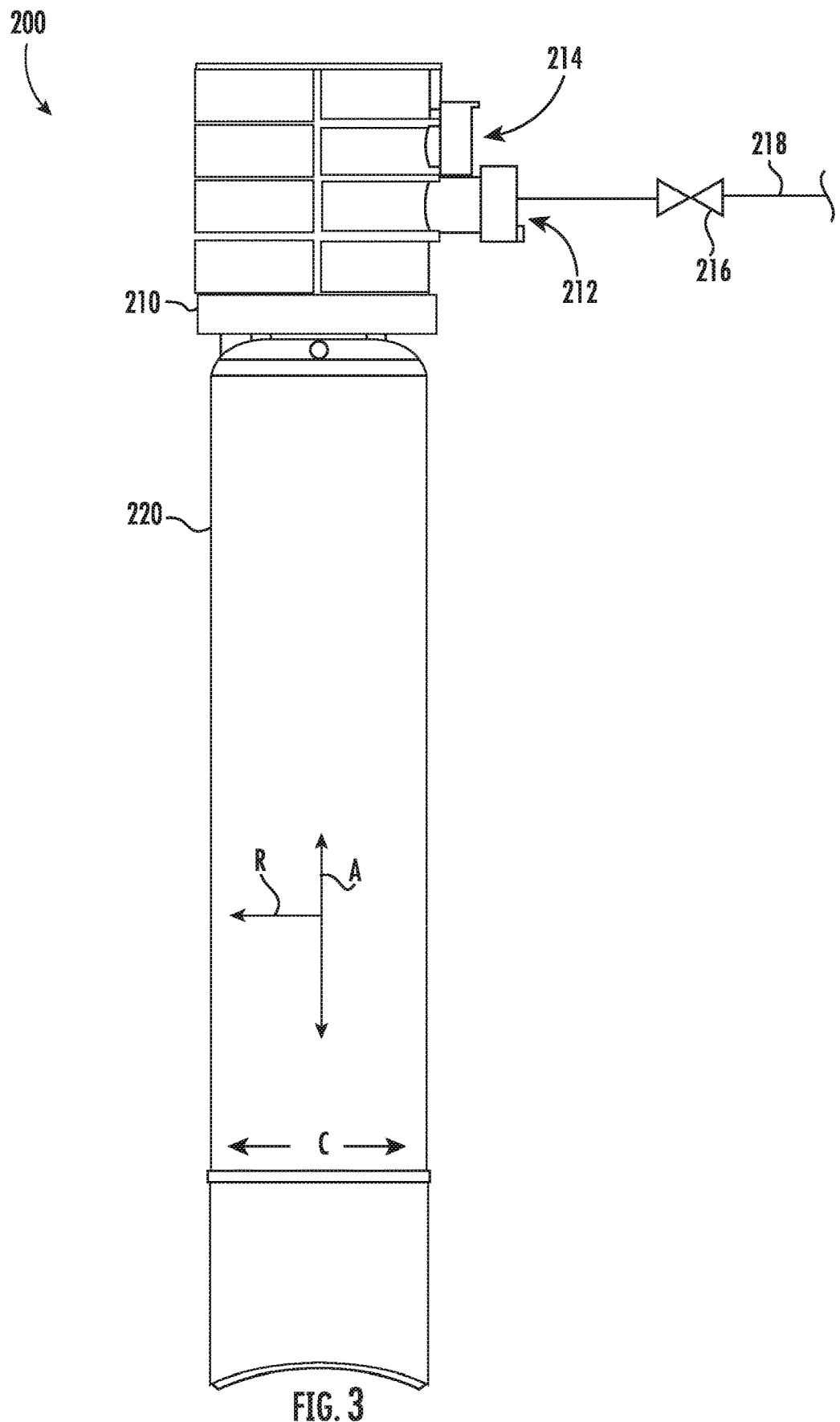
FIG. 3 provides a schematic, side elevation view of a water filter assembly according to an exemplary embodiment of the present disclosure.

FIG. 3 provides a schematic, side elevation view of a water filter assembly 200 according to an exemplary embodiment of the present disclosure. Water filter assembly 200 may be used in the refrigerator appliance 100, e.g., as water filter assembly 170 (FIG. 2). In alternative exemplary embodiments, water filter assembly 200 may be used in any other suitable appliance, such as an ice maker, as a point of use water filtration system, e.g., installed beneath a sink or for use with a shower, as part of a gravity fed filtration system, or as a point of entry water filtration system for an entire household. Thus, the present subject matter is not limited to any particular installation or location for water filter assembly 200.

Water filter assembly 200 defines an axial direction A, a radial direction R, and a circumferential direction C extending three hundred sixty degrees (360°) about the axial direction A. Water filter assembly 200 includes a manifold 210 and a filter cartridge 220 removably mounted to manifold 210. Although not shown, manifold 210 may include a mounting bracket for mounting water filter assembly 200, e.g., to housing 120 of refrigerator appliance 100 (FIG. 2), to a kitchen cabinet beneath a kitchen sink, or to a wall within a house. Manifold 210 defines an inlet 212 and an outlet 214. Inlet 212 may be in fluid communication with a water supply and may receive unfiltered water from the water supply. From inlet 212, such unfiltered water is directed into filter cartridge 220. Such unfiltered water passes through filter cartridge 220 and exits manifold 210 at outlet 214 as filtered water. Such filtered water may, e.g., be directed to the ice maker within insulated housing 142 (FIG. 2), discharging outlet 134 (FIG. 2), a kitchen sink faucet, and/or any other suitable use. In some embodiments, the positioning of the inlet 212 and the outlet 214 may be reversed.

Notably, the unfiltered water flowing into manifold 210 through inlet 212 may be pressurized. For instance, the incoming water may be pressurized between about twenty and one hundred twenty pounds per square inch (20-120 psi). Additionally, as shown in FIG. 3, a valve 216 may be positioned along a supply conduit 218 to selectively allow a flow of unfiltered water to flow downstream to water filter assembly 200. Supply conduit 218 may provide fluid communication between water supply and water filter assembly 200. Valve 216 may be communicatively coupled with controller 180 so that valve 216 may be selectively actuated between an open position and a closed position, e.g., to allow or cut off the flow of unfiltered water to water filter assembly 200.

Figure 4:
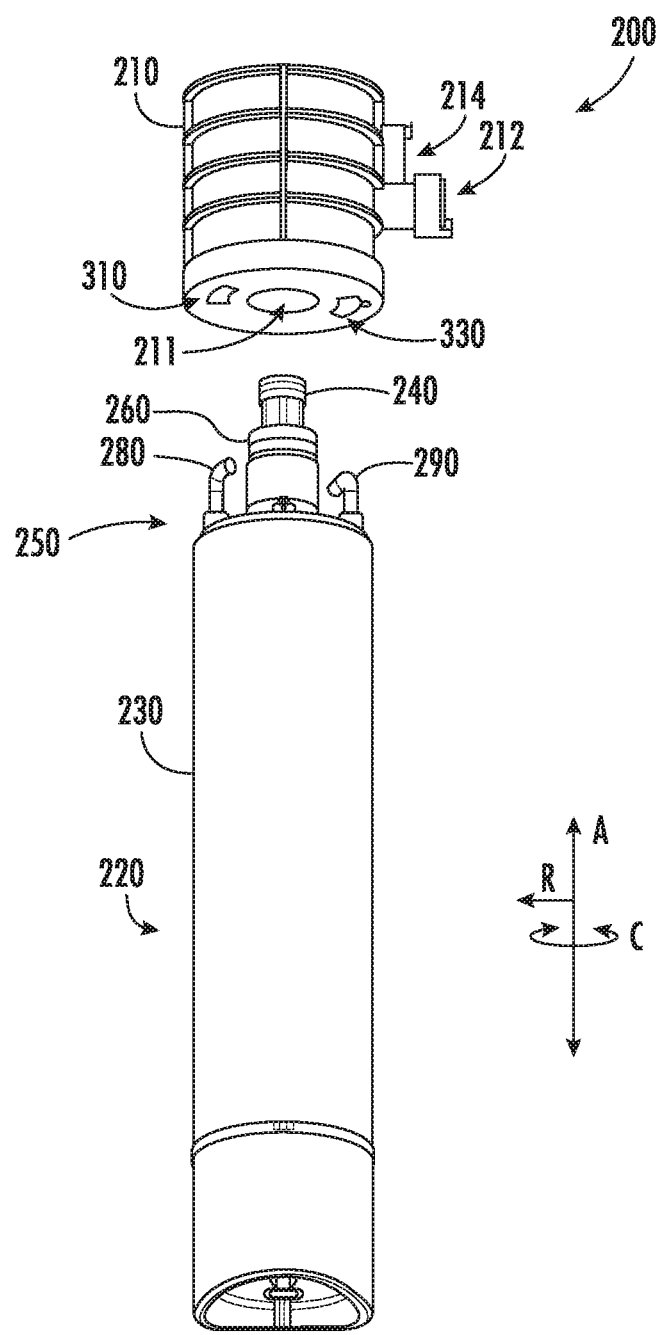
FIG. 4 provides a perspective view of the water filter assembly of FIG. 3 depicting a filter cartridge removed from a manifold of the water filter assembly.

FIG. 4 provides a perspective view of water filter assembly 200 of FIG. 3 depicting filter cartridge 220 removed from manifold 210. As shown, filter cartridge 220 includes a casing, sheath or housing 230 that defines an interior volume or chamber 231. Housing 230, e.g., an annular sidewall of housing 230, extends between a top portion 250 and a bottom portion 252, e.g., along the axial direction A. Housing 230 also defines an opening 233 at top portion 250 of housing 230. Opening 233 permits access to chamber 231 of housing 230. Housing 230 may have only one opening 233 through housing 230 to chamber 231, in certain exemplary embodiments, e.g., such that all fluid flow into and out of chamber 231 passes through opening 233.

Figure 5:
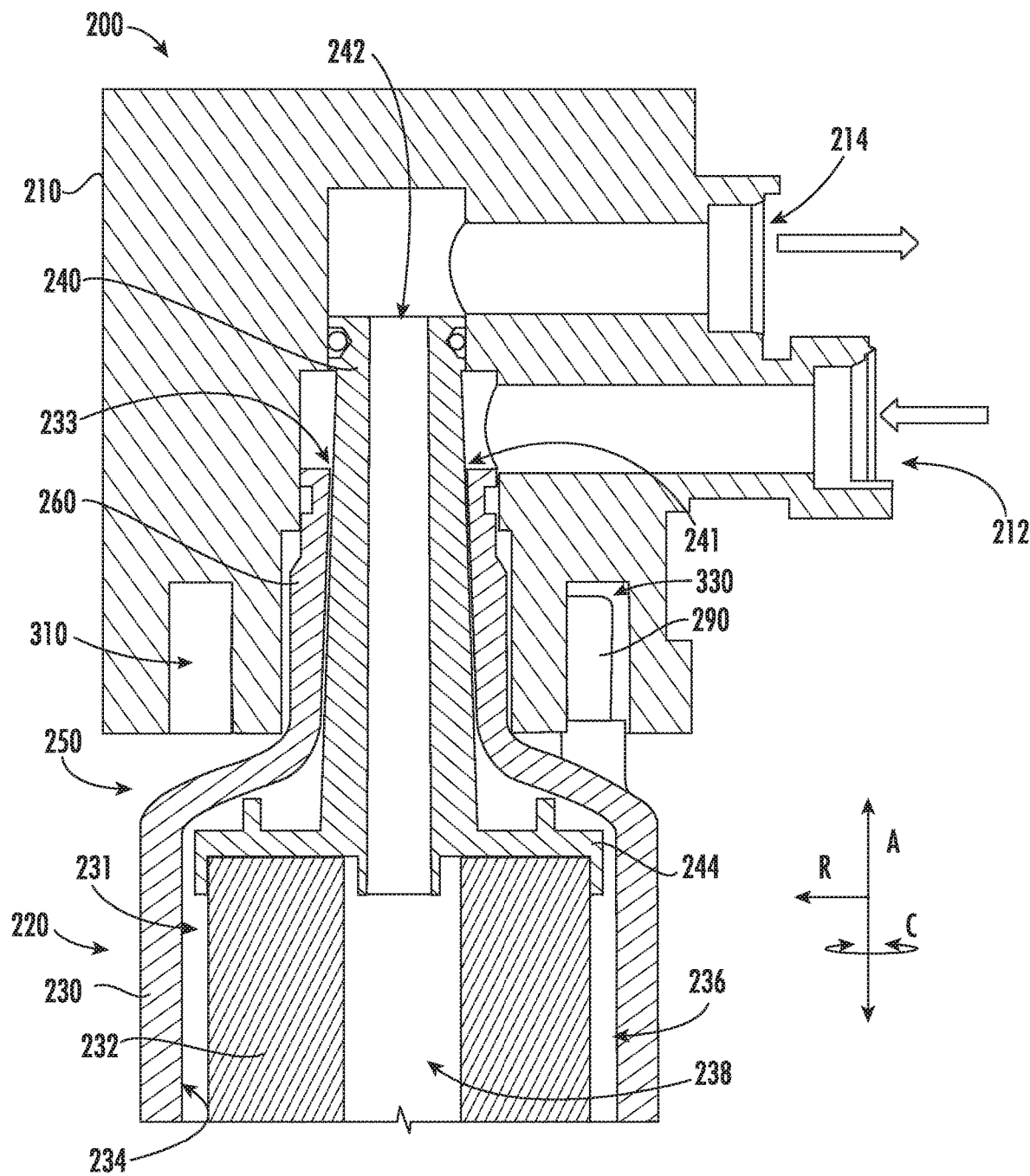
FIG. 5 provides a close up, cross sectional view of the water filter assembly of FIG. 3 depicting the filter cartridge mounted to the manifold.

FIG. 5 provides a close up, cross sectional view of filter cartridge 220 mounted to manifold 210 of water filter assembly 200 of FIG. 3. As shown, housing 230 of filter cartridge 220 includes a port or neck 260, e.g., at top portion 250 of housing 230. Opening 233 may be positioned at or defined at neck 260 of housing 230. As shown in FIG. 5, a sleeve 240 is received within opening 233 at neck 260. When inserted, sleeve 240 defines a first passage or inlet 241 and a second passage or outlet 242 of filter cartridge 220. Inlet 241 is in fluid communication with inlet 212 of manifold 210 and with chamber 231 of housing 230. Thus, unfiltered water can enter chamber 231 of housing 230 through inlet 241. Outlet 242 is in fluid communication with outlet 214 of manifold 210 and chamber 231 of housing 230. Thus, filtered water can exit chamber 231 of housing 230 through outlet 242. When filter cartridge 220 is mounted to manifold 210, a main chamber 211 defined by manifold 210 receives a portion of sleeve 240 and neck 260 of filter cartridge 220.

A filter media 232 is disposed within chamber 231. Filter media 232 is spaced apart from an inner surface 234 of housing 230, e.g., along the radial direction R, within chamber 231. A cap 244 of sleeve 240 may be positioned within chamber 231 on filter media 232 at top portion 250 of housing 230 in order to define a radial gap between inner surface 234 of housing 230 and an outer surface of filter media 232. As an example, cap 244 may be glued or in some other manner fixed to filter media 232 in order to define the radial gap, position filter media 232 vertically, and block potential bypass flow around filter media 232 to outlet 242.

Filter media 232 also divides chamber 231 into an unfiltered volume 236 and a filtered volume 238. Filter media 232 can remove impurities and contaminants from water passing through filter media 232 from the unfiltered volume 236 to the filtered volume 238. Filter media 232 may include any suitable mechanism for filtering water such as, e.g., ceramic filters, activated carbon filters, polymer filters, membrane filters, sediment type filters, or reverse osmosis filters. As used herein, the term "unfiltered" describes a volume within chamber 231 that is not filtered relative to filter media 232. However, it will be understood that water filter assembly 200 may include additional filters that filter water entering chamber 231. Thus, "unfiltered volume" may be filtered relative to other filters but not filter media 232.

As an example, water passing though water filter assembly 200 can follow a path through water filter assembly 200. In particular, unfiltered water can enter water filter assembly 200 through inlet 212 of manifold 210. Such unfiltered water can then flow though inlet 241 into the unfiltered volume 236 of chamber 231. Such unfiltered water can pass though filter media 232 to remove impurities and can exit filter media 232 into the filtered volume 238 of chamber 231 as filtered water. Such filtered water can then pass through outlet 242 and exit water filter assembly 200 through outlet 214 of manifold 210.

In such a manner, unfiltered water can follow the path through water filter assembly 200. In particular, unfiltered water can pass though filter media 232, and filtered water can exit water filter assembly 200. Such filtering can improve taste and/or safety of water. However, effectiveness of filter media 232 can decrease over time, e.g., due to pores of filter media 232 becoming clogged, pore surfaces becoming saturated with contaminates, and/or bacteria can accumulate or grow within filter media 232 over time. Thus, filter media 232 and/or filter cartridge 220 may require replacement or servicing after a certain time interval in order to maintain proper operation of water filter assembly 200. In particular, filter media 232 and/or filter cartridge 220 may require replacement or servicing about every six months. In accordance with exemplary aspects of the present disclosure, as discussed in greater detail below, water filter assembly 200 includes features that facilitate removal and mounting of filter cartridge 220 from or to manifold 210 of water filter assembly 200.

Figure 6:
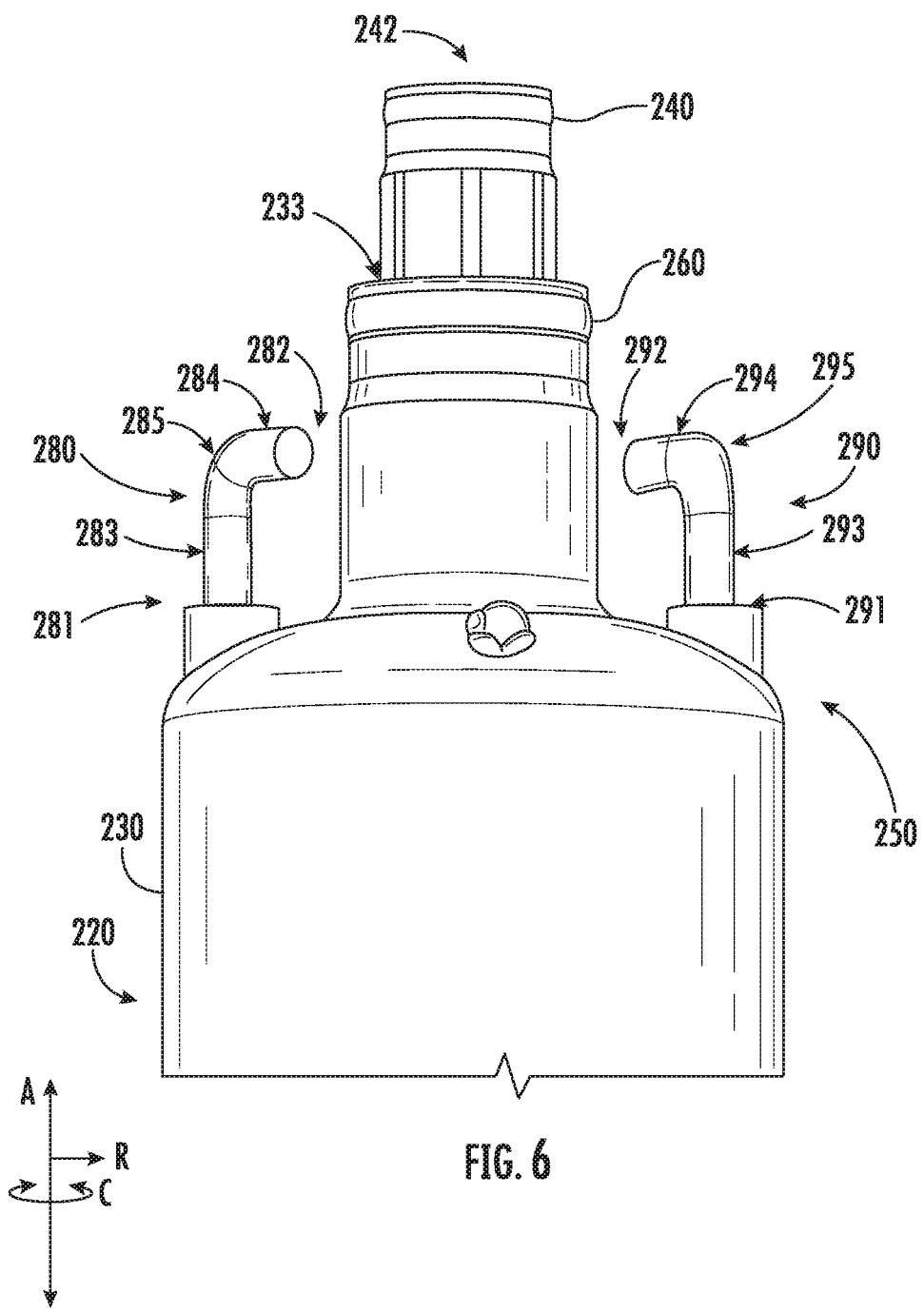
FIG. 6 provides a close up, perspective view of a top portion of the filter cartridge of the water filter assembly of FIG. 3.
Figure 7:
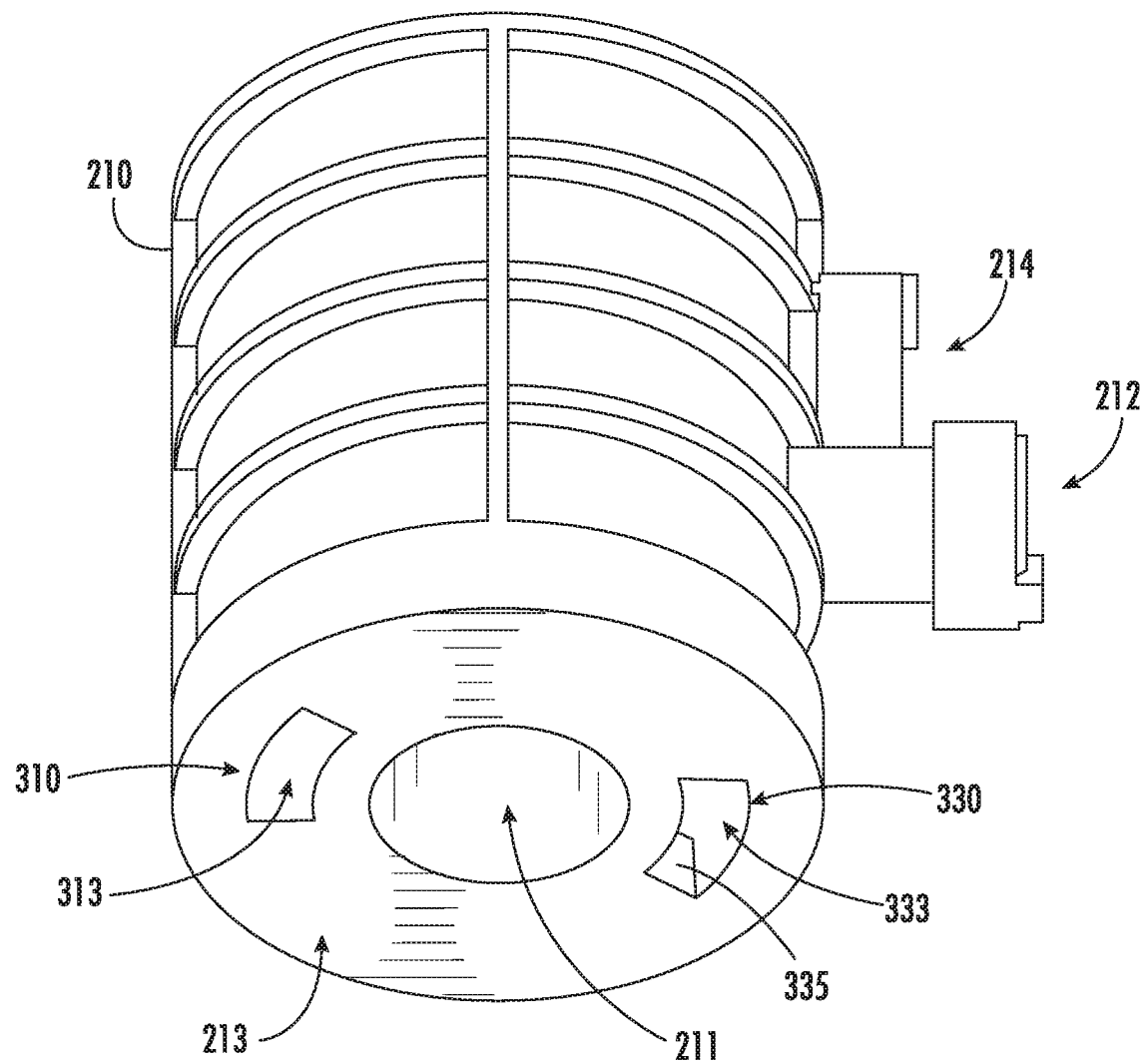
FIG. 7 provides a bottom perspective view of the manifold of the water filter assembly of FIG. 3.
Figure 8:
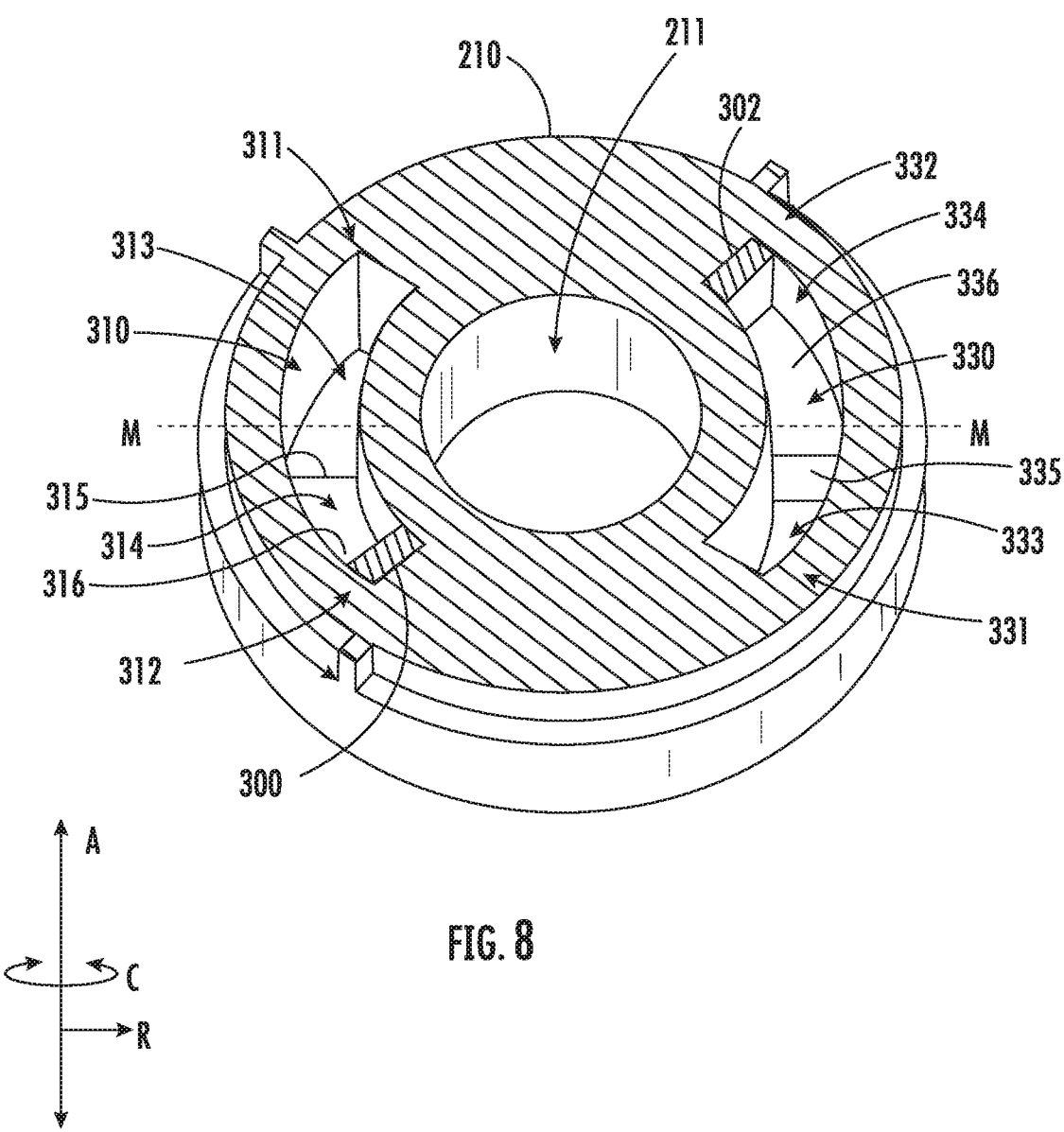
FIG. 8 provides a cross sectional view of the manifold of the water filter assembly of FIG. 3.
Figure 9:
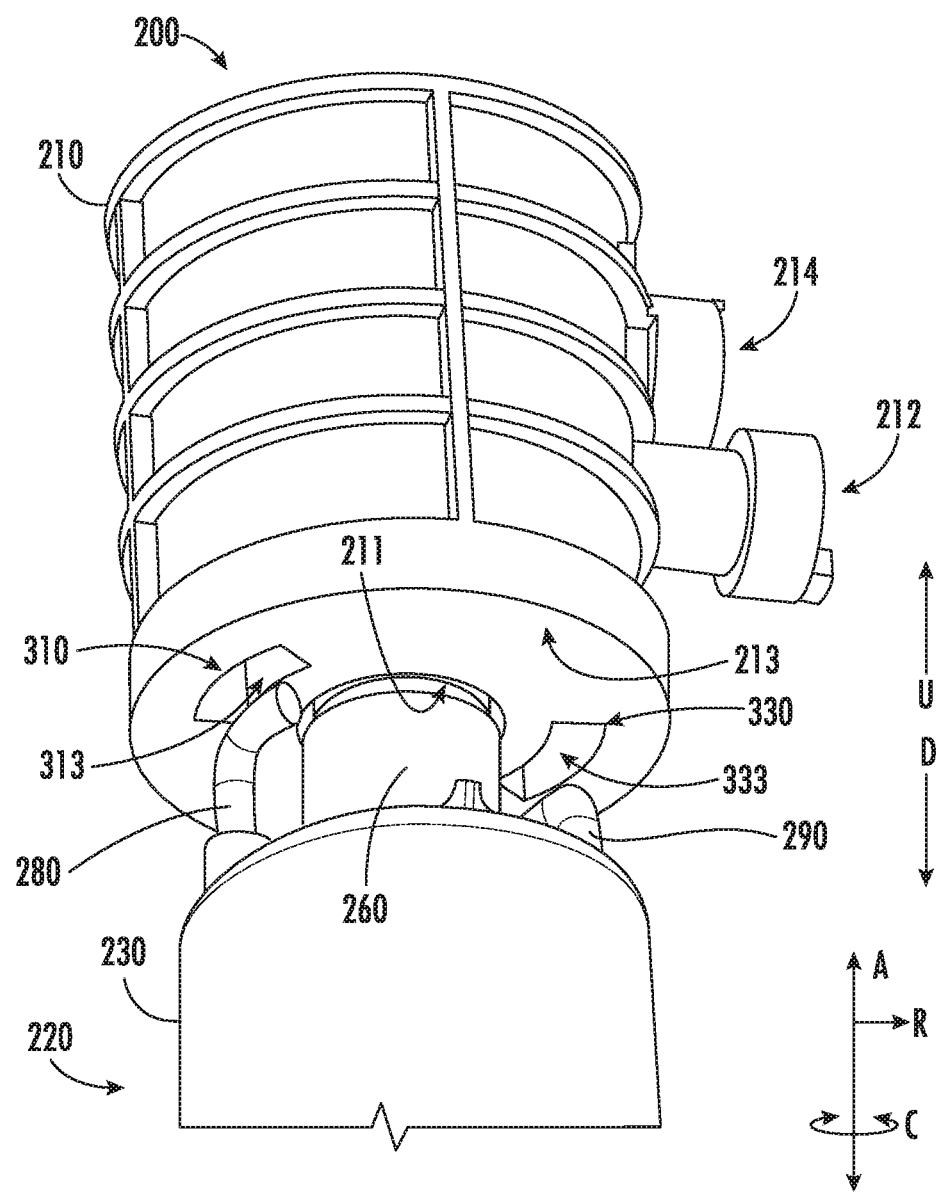
FIG. 9 provides a perspective view of the water filter assembly of FIG. 3 depicting the filter cartridge being inserted into the manifold.
Figure 10:
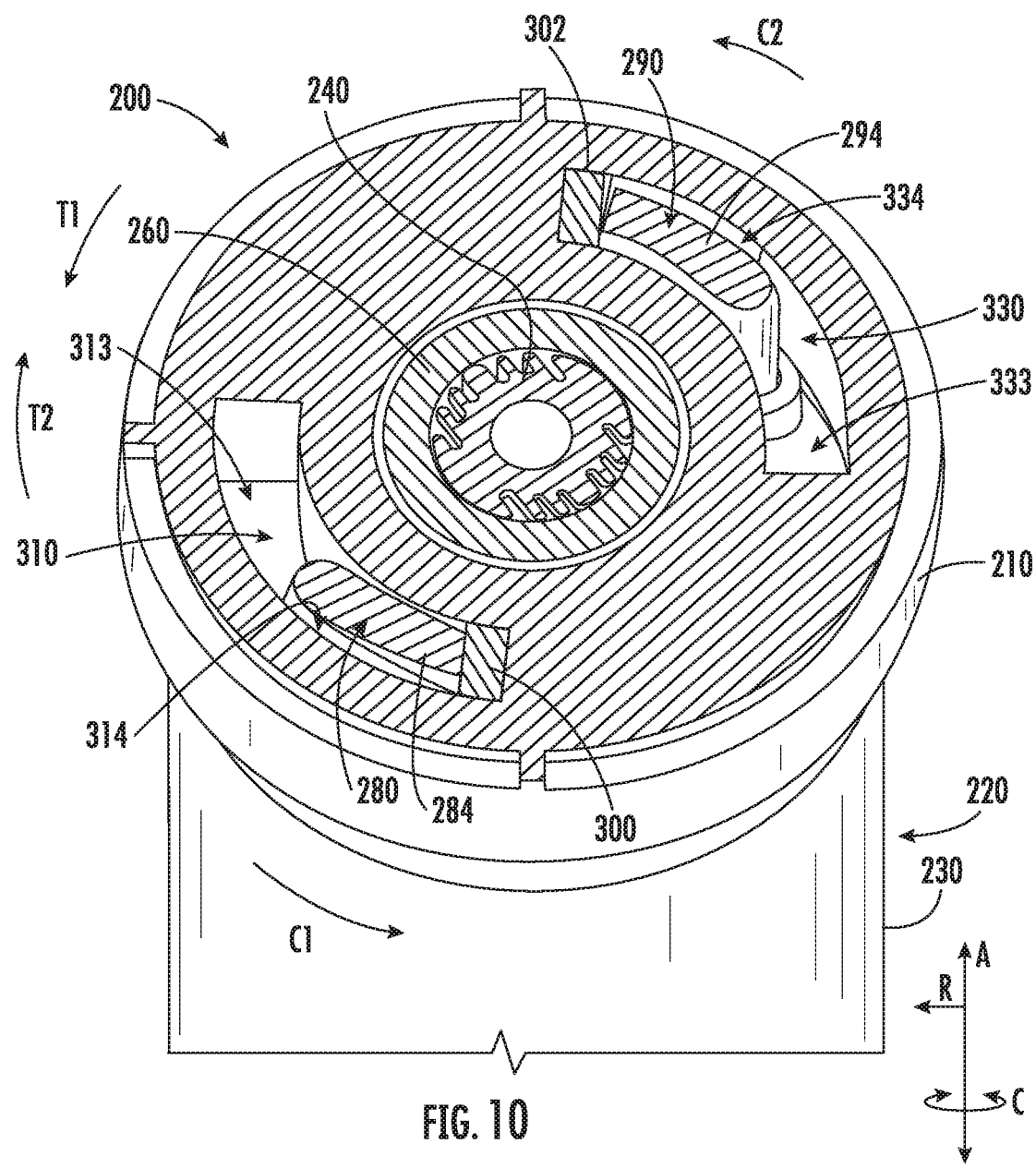
FIG. 10 provides a cross sectional view of the water filter assembly of FIG. 3 depicting the filter cartridge mounted to the manifold.

FIGS. 6, 7, 8, 9, and 10 provide one exemplary embodiment of water filter assembly 200 having a magnetic interface that facilitates removal and mounting of filter cartridge 220 from or to manifold 210 of water filter assembly 200. In particular, FIG. 6 provides a close up, perspective view of top portion 250 of filter cartridge 220 of the water filter assembly 200. FIG. 7 provides a bottom perspective view of manifold 210. FIG. 8 provides a cross sectional view of manifold 210. FIG. 9 provides a perspective view of filter cartridge 220 being inserted into manifold 210. FIG. 10 provides a cross sectional view of water filter assembly 200 depicting filter cartridge 220 mounted to manifold 210.

As shown in FIG. 6, filter cartridge 220 includes a first magnetic member 280 and a second magnetic member 290 extending from housing 230 at top portion 250 of filter cartridge 220. For this embodiment, first magnetic member 280 and second magnetic member 290 are spaced from one another along the circumferential direction C. In particular, for this embodiment, first magnetic member 280 and second magnetic member 290 extend from housing 230 or are positioned radially opposite one another. That is, first magnetic member 280 and second magnetic member 290 are positioned about one hundred eighty degrees (180°) from one another along the radial direction R. First and second magnetic members 280, 290 may each be overmolded to housing 230 or attached to housing 230 in other suitable manners.

First magnetic member 280 extends between a proximal end 281 and a distal end 282 and includes a first portion 283 and a second portion 284. At proximal end 281 of first magnetic member 280, first portion 283 extends from housing 230 along the axial direction A. Second portion 284 of first magnetic member 280 extends from first portion 283 along a direction substantially orthogonal to the axial direction A and forms distal end 282 of first magnetic member 280. For this embodiment, first portion 283 transitions to second portion 284 at a curved elbow 285. As further depicted, second portion 284 extends from first portion 283 to distal end 282 along the circumferential direction C. That is, second portion 284 is curved as it extends between first portion 283 and distal end 282, e.g., along the circumferential direction C.

Second magnetic member 290 extends between a proximal end 291 and a distal end 292 and includes a first portion 293 and a second portion 294. At proximal end 291 of second magnetic member 290, first portion 293 extends from housing 230 along the axial direction A. Second portion 294 of second magnetic member 290 extends from first portion 293 along a direction substantially orthogonal to the axial direction A and forms distal end 292 of second magnetic member 290. For this embodiment, first portion 293 transitions to second portion 294 at a curved elbow 295. As further depicted, second portion 294 extends from first portion 293 to distal end 292 along the circumferential direction C. That is, second portion 294 is curved as it extends between first portion 293 and distal end 292, e.g., along the circumferential direction C. Notably, second portion 284 of first magnetic member 280 and second portion 294 of second magnetic member 290 extend from their respective first portions 283, 293 along a direction substantially orthogonal to the axial direction A opposite one another, which is best shown in FIG. 10. As shown in FIG. 10, second portion 284 of first magnetic member 280 extends in a first direction C1 and second portion 294 of second magnetic member 290 extends in a second direction C2.

In some embodiments, with reference again particularly to FIG. 6, first magnetic member 280 and second magnetic member 290 are formed of a material capable of being magnetically attracted to magnets, such as e.g., first magnet 300 and second magnet 302 of FIG. 10). For instance, in some embodiments, first magnetic member 280 and second magnetic member 290 are each formed of a ferromagnetic material. Specifically, in some embodiments, first magnetic member 280 and second magnetic member 290 are each formed of iron. In yet other embodiments, only the respective second portions 284, 294 of first and second magnetic members 280, 290 are formed of a magnetic material, e.g., a ferromagnetic material. In such embodiments, the first portions 283, 293 may be formed of a suitable non-magnetic material, such as an insulating material, e.g., plastic. Further, in such embodiments, first portion 283 of first magnetic member 280 and first portion 293 of second magnetic member 290 may be integrally formed with housing 230 as a single, continuous piece, or alternatively, first and second magnetic members 280, 290 may be attached or affixed to housing 230. Second portions 284, 294 may be overmolded or otherwise attached to their respective first portions 283, 293 in such embodiments. By forming only the second portions 284, 294 of first and second magnetic members 280, 290 of magnetic material, cost savings may be realized.

As shown in FIGS. 7 and 8, manifold 210 defines a first slot 310 and a second slot 330. First slot 310 extends between a first end 311 and a second end 312, e.g., along the circumferential direction C. In particular, for this embodiment, first slot 310 extends about ninety degrees (90°) along the circumferential direction C. As depicted, first slot 310 has an opening 313 defined by bottom wall 213 of manifold 210. Opening 313 is defined by bottom wall 213 generally along the circumferential direction C. Opening 313 extends from first end 311 to about a midline M that is midway along the arc between first end 311 and second end 312 of first slot 310. As shown best in FIGS. 9 and 10, opening 313 is sized to receive first magnetic member 280. First slot 310 also has a recessed groove 314 as shown in FIG. 8. Recessed groove 314 extends from about the midline M to second end 312 of first slot 310, e.g., along the circumferential direction C. Recessed groove 314 of first slot 310 has a rise surface 315 that extends in a plane along the axial direction A and a run surface 316 that extends from rise surface 315 to second end 312 in a plane substantially orthogonal to the axial direction A. When filter cartridge 220 is mounted to manifold 210, first magnetic member 280 is inserted through opening 313 and moved upward along the axial direction A. Then, filter cartridge 220 is twisted about the axial direction A so that second portion 284 of first magnetic member 280 is received within recessed groove 314 of first slot 310. Thus, recessed groove 314 is sized to receive second portion 284 of first magnetic member 280.

Second slot 330 extends between a first end 331 and a second end 332, e.g., along the circumferential direction C. More particularly, for this embodiment, second slot 330 extends about ninety degrees (90°) along the circumferential direction C. Second slot 330 is spaced from first slot 310 along the circumferential direction C and is positioned radially opposite first slot 310. Stated differently, second slot 330 is positioned one hundred eighty degrees (180°) from first slot 310 along the circumferential direction C. Moreover, as depicted, second slot 330 has an opening 333 defined by bottom wall 213 of manifold 210. Opening 333 is defined by bottom wall 213 generally along the circumferential direction C. Opening 333 extends from first end 331 to about a midline M that is midway along the arc between first end 331 and second end 332 of second slot 330. As shown best in FIGS. 9 and 10, opening 333 is sized to receive second magnetic member 290. Second slot 330 also has a recessed groove 334. Recessed groove 334 extends from about the midline M to second end 332 of second slot 330, e.g., along the circumferential direction C. Recessed groove 334 of second slot 330 has a rise surface 335 that extends in a plane along the axial direction A and a run surface 336 that extends from rise surface 335 to second end 332 in a plane substantially orthogonal to the axial direction A. When filter cartridge 220 is mounted to manifold 210, second magnetic member 290 is inserted through opening 333 and moved upward along the axial direction A. Then, filter cartridge 220 is twisted about the axial direction A so that second portion 294 of second magnetic member 290 is received within recessed groove 334 of second slot 330. Thus, recessed groove 334 is sized to receive second portion 294 of second magnetic member 290.

As shown particularly in FIG. 10, a first magnet 300 is disposed within recessed groove 314 of first slot 310 and a second magnet 302 is disposed within recessed groove 334 of second slot 330. More particularly, first magnet 300 is disposed at second end 312 of first slot 310 within recessed groove 314 and second magnet 302 is disposed at second end 332 of second slot 330 within recessed groove 334. When filter cartridge 220 is mounted to manifold 210, first magnetic member 280 is received within first slot 310. More particularly, second portion 284 is received within recessed groove 314 of first slot 310. When second portion 284 is positioned proximate or in contact with first magnet 300, first magnetic member 280 becomes magnetized by first magnet 300, and accordingly, first magnetic member 280 fixes to first magnet 300 due to the magnetic attraction between first magnetic member 280 and first magnet 300. Similarly, when filter cartridge 220 is mounted to manifold 210, second magnetic member 290 is received within second slot 330. More specifically, second portion 294 is received within recessed groove 334 of second slot 330. When second portion 294 is positioned proximate or in contact with second magnet 302, second magnetic member 290 becomes magnetized by second magnet 302, and accordingly, second magnetic member 290 fixes to second magnet 302 due to the magnetic attraction between second magnetic member 290 and second magnet 302. Accordingly, when filter cartridge 220 is mounted to manifold 210, filter cartridge 220 is secured to and held in place by the magnetic attraction between first magnetic member 280 and first magnet 300 as well as second magnetic member 290 and second magnet 302.

In addition, with reference to FIGS. 8 and 10, filter cartridge 220 is further secured to manifold 210 by second portion 284 of first magnetic member 280 as second portion 284 is seated on and supported by run surface 316 of recessed groove 314 when first magnetic member 280 is received within recessed groove 314 of first slot 310. In a similar fashion, filter cartridge 220 is further secured to manifold 210 by second portion 294 of second magnetic member 290 as second portion 294 is seated on and supported by run surface 336 of recessed groove 334 when second magnetic member 290 is received within recessed groove 334 of second slot 330. Accordingly, the seating of the second portions 284, 294 of the first and second magnetic members 280, 290 on the run surfaces 316, 336 of the recessed grooves 314, 334 of the first and second slots 310, 330, respectively, supports the weight of the filter cartridge 220 and its contents when filter cartridge 220 is mounted to manifold 210.

As further provided in FIG. 10, in some exemplary embodiments, a first protective sleeve 286 is wrapped around at least a portion of second portion 284 of first magnetic member 280. Similarly, in some embodiments, a second protective sleeve 296 is wrapped around at least a portion of first portion 293 of second magnetic member 290. In some embodiments, first protective sleeve 286 is wrapped around second portion 284 of first magnetic member 280 substantially along the length of second portion 284 that extends along a direction orthogonal to the axial direction A. Likewise, in some embodiments, second protective sleeve 296 is wrapped around second portion 294 of second magnetic member 290 substantially along the length of second portion 294 that extends along a direction orthogonal to the axial direction A. Notably, preferably, distal end 282 of first magnetic member 280 and distal end 292 of second magnetic member 290 is not covered by their respective protective sleeves 286, 296. In this way, the magnetic field between first magnetic member 280 and first magnet 300 as well as the magnetic field between second magnetic member 290 and second magnet 302 are not disturbed or obstructed. First and second protective sleeves 286, 296 may each be formed of an elastic material, such as e.g., rubber or foam. In this way, when filter cartridge 220 is mounted to manifold 210, second portion 284 of first magnetic member 280 does not directly contract run surface 316 of recessed groove 314 of first slot 310 and second portion 294 of second magnetic member 290 does not directly contract run surface 336 of recessed groove 334 of second slot 330, and consequently, the first and second magnetic members 280, 290 formed of magnetic material and the manifold surfaces are better protected from damage when filter cartridge 220 is mounted to manifold 210. Further, the protective sleeves 286, 296 may better grasp their respective run surfaces 316, 336 so as to prevent filter cartridge 220 from slipping, e.g., along the circumferential direction C.

As described above, filter cartridge 220 is removably mounted to manifold 210 by magnetic features that facilitate mounting and removal of filter cartridge 220 from manifold 210. One exemplary manner in which a filter cartridge may be mounted to a manifold will now be described.

With reference now to FIGS. 6 through 10, neck 260 of filter cartridge 220 and sleeve 240 (FIG. 5) are aligned with main chamber 211, first magnetic member 280 of filter cartridge 220 is aligned with opening 313 of first slot 310, and second magnetic member 290 of filter cartridge 220 is aligned with opening 333 of second slot 330 as shown in FIG. 9. Once these various components are aligned, filter cartridge 220 is moved upward, denoted as arrow U in FIG. 9, toward manifold 210 along the axial direction A. Neck 260 of filter cartridge 220 and sleeve 240 are received within main chamber 211 of manifold 210 (FIG. 5), first magnetic member 280 is received within first slot 310 (FIG. 10), and second magnetic member 290 is received within second slot 330 (FIG. 10). More particularly, first magnetic member 280 is received within opening 313 of first slot 310 and second magnetic member 290 is received within opening 333 of second slot 330.

Once first and second magnetic members 310, 330 are inserted into the respective openings 313, 333 of first and second slots 310, 330, filter cartridge 220 is twisted in a first twisting direction T1 along the circumferential direction C. When filter cartridge 220 is twisted in the first twisting direction T1, second portion 284 of first magnetic member 280 is received within recessed groove 314 of first slot 310, and similarly, second portion 294 of second magnetic member 290 is received within recessed groove 334 of second slot 330. As this occurs, first magnetic member 280 becomes magnetized by first magnet 300 and thus becomes attracted to first magnet 300. Similarly, second magnetic member 290 becomes magnetized by second magnet 302 and thus becomes attracted to second magnet 302. The magnetic attraction between the first and second magnetic members 280, 290 and their respective first and second magnets 300, 302 secures and holds filter cartridge 220 in place. Further, as noted above, filter cartridge 220 is further secured to manifold by the seating of second portion 284 of first magnetic member 280 on run surface 316 of first slot 310 and second portion 294 of second magnetic member 290 on run surface 336 of second slot 330. Once first and second magnetic members 280, 290 are magnetically attracted to their respective first and second magnets 300, 302 and second portions 284, 294 are seated on their respective run surfaces 316, 336, filter cartridge 220 is mounted to manifold 210 and secured in place.

Before mounting filter cartridge 220 to manifold 210, the water supplied to water filter assembly 200 is preferably shut or turned off if it has not already been done so. Once filter cartridge 220 is mounted to manifold 210, the water supplied to water filter assembly 200 is then turned on so that water filter assembly 200 may filter water. Refrigerator appliance 100 or another appliance for which water filter assembly 200 provides filtering capability may include features that ensure safe mounting of filter cartridge 220 to manifold 210.

Figure 11:
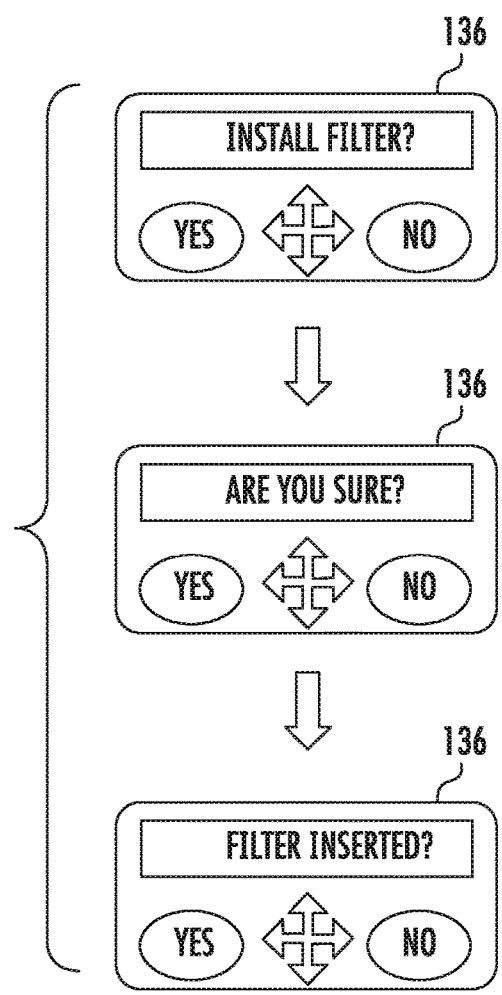
FIG. 11 provides a sequence flow chart of one exemplary method for ensuring safe mounting installation of a filter cartridge to a manifold according to an exemplary embodiment of the present disclosure.

FIG. 11 provides a sequence flow chart of one exemplary method for ensuring safe mounting installation of filter cartridge 220 to manifold 210 according to an exemplary embodiment of the present disclosure. As shown, prior to mounting filter cartridge 220 to manifold 210, a user may use input selectors and display of user interface panel 136 to indicate that filter installation is desired. A user may select "Yes" when prompted "Install filter?" on the display of user interface panel 136. To confirm, the user may be prompted with a confirmation prompt "Are you sure?" The user may confirm by once again selecting "Yes." Once a user has communicated a desire to install a filter and confirmed such intent, controller 180 (FIG. 1) controls valve 216 (FIG. 3) to move to a closed position, which effectively shuts off the water flowing to water filter assembly 200. As such, filter cartridge 220 may safely be mounted to manifold 210 (i.e., without pressurized water spilling out). Once the installation is complete, a user may then confirm that filter cartridge 220 is mounted to manifold 210 by selecting "Yes" to the prompt "Filter installed?" Upon confirmation, controller 180 controls valve 216 to an open position such that water may resume flowing into water filter assembly 200 for filtering.

It will be appreciated that other methods of ensuring safe installation of filter cartridge 220 to manifold 210 are possible. For instance, in alternative exemplary embodiments, refrigerator appliance 100 or another appliance for which water filter assembly 200 provides filtering capability may include alternative mechanical features that shut off the water flow to manifold 210 to ensure safe mounting and removal of filter cartridge 220 to manifold 210.

Figure 13:
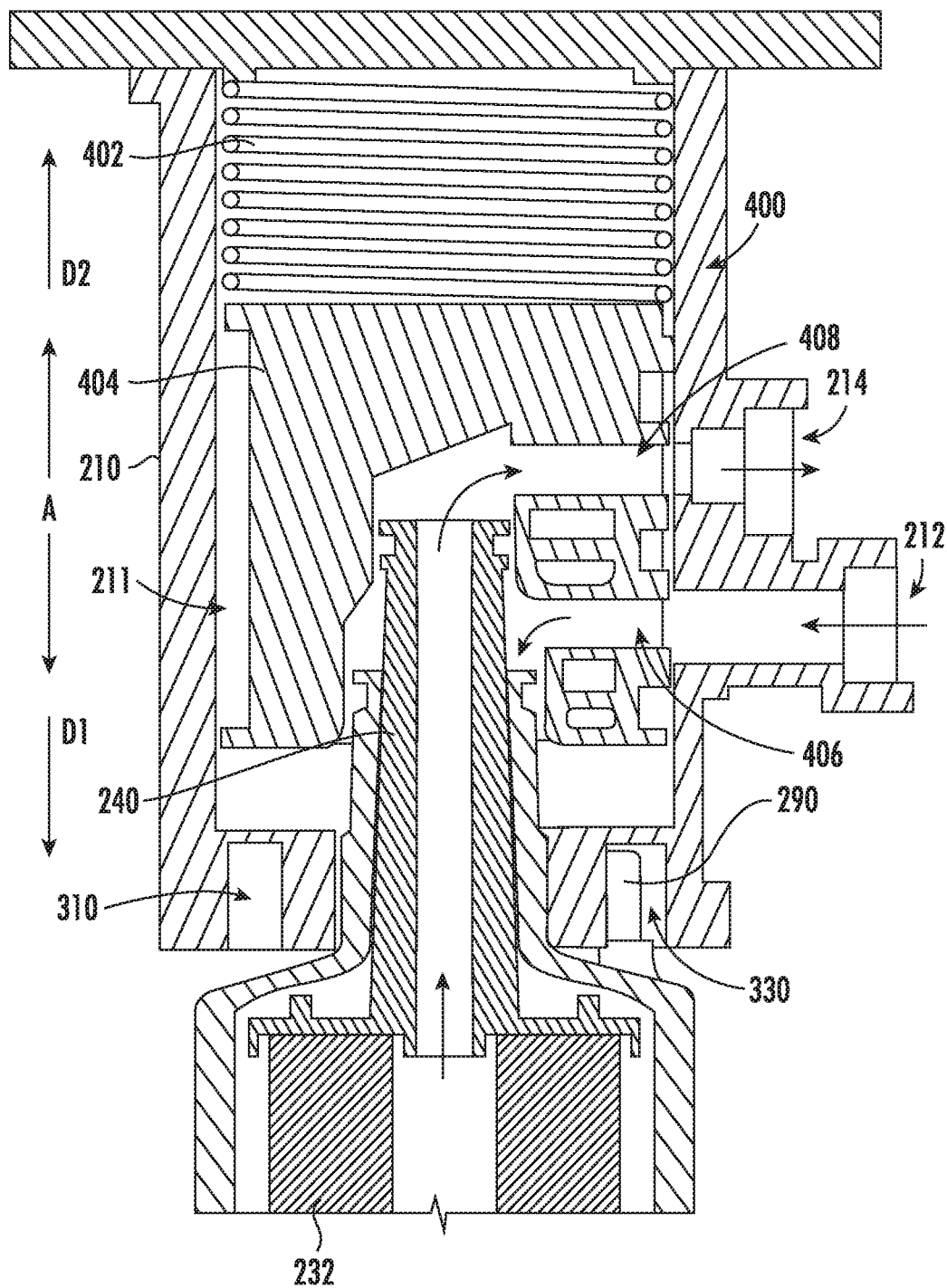
FIG. 13 provides a close up, cross sectional view of a filter cartridge mounted to a manifold having an exemplary water shutoff assembly disposed within a main chamber defined by the manifold according to an exemplary embodiment of the present disclosure.
Figure 14:
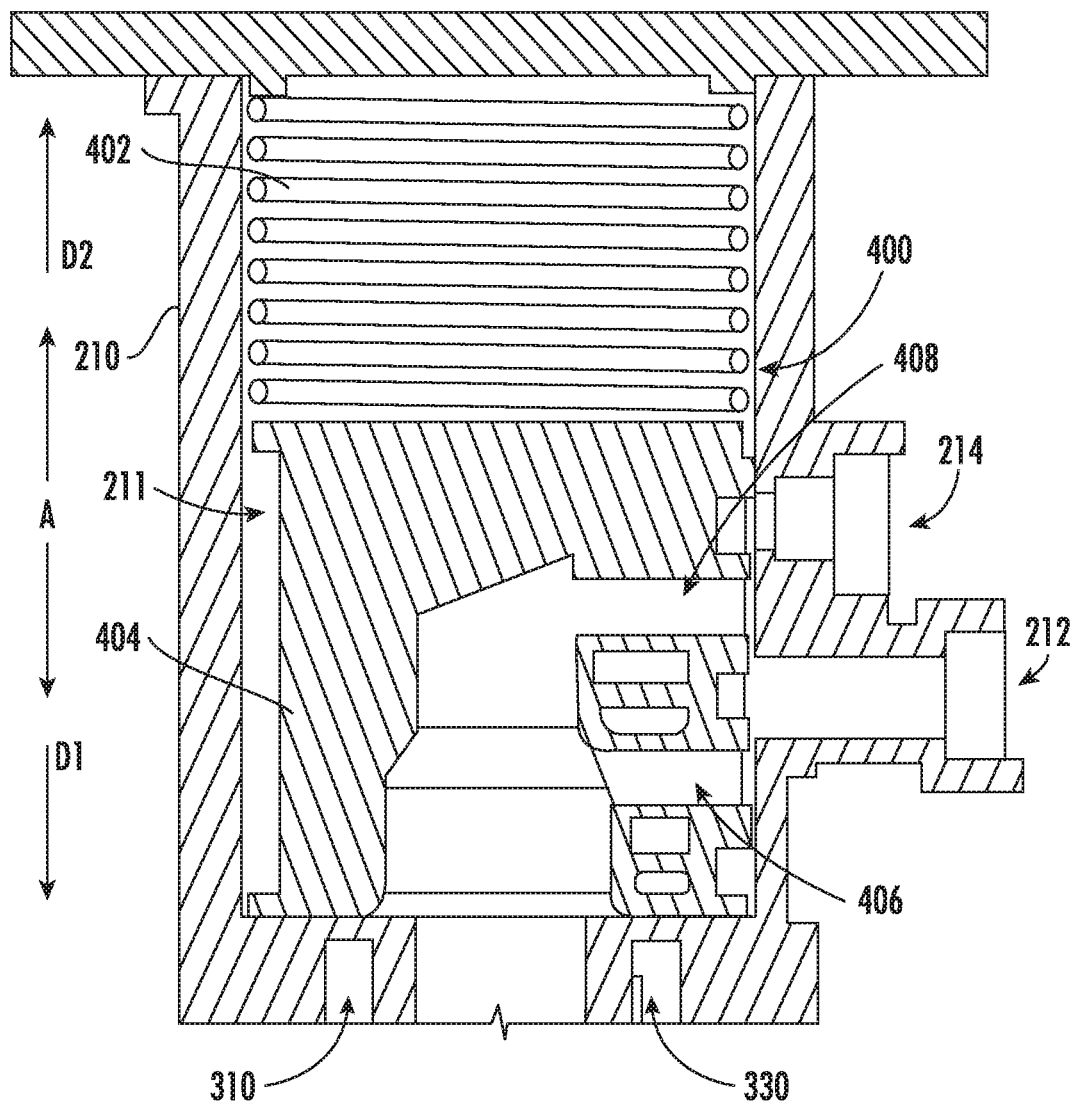
FIG. 14 provides a close up, cross sectional view of the manifold and the exemplary water shutoff assembly disposed within the main chamber defined by the manifold with the filter cartridge removed from the manifold according to an exemplary embodiment of the present disclosure.

In some embodiments, manifold 210 may include mechanical features that selectively allow flow of water to manifold 210. As one example, FIGS. 13 and 14 provide cross sectional views of manifold 210 and depict a water shutoff assembly 400 disposed therein for shutting off the flow of water to manifold 210 when filter cartridge 220 is removed from manifold 210 and allowing a flow of water to manifold 210 when filter cartridge 220 is mounted thereto. For this embodiment, main chamber 211 is defined by manifold 210 in a generally cylindrical shape that extends substantially along the axial length of manifold 210. Water shutoff assembly 400 includes a spring 402 and a chute 404 that are each received within main chamber 211. In particular, chute 404 is slideably received within main chamber 211 and is movable along the axial direction A. Chute 404 is movable in a first direction D1 along the axial direction A by spring 402, which is a downward direction in this embodiment. That is, when filter cartridge 220 is removed from manifold 210, spring 402 expands causing chute 404 to move in the first direction D1. Chute is movable in a second direction D2 along the axial direction A by sleeve 240 and neck 260 of filter cartridge 220 as filter cartridge 220 is mounted to manifold 210. In this embodiment, the second direction D2 is an upward direction along the axial direction A. When filter cartridge 220 is mounted to manifold 210, sleeve 240 and neck 260 force chute 404 in the second direction D2 and overcome the spring force of spring 402, which causes spring 402 to compress, e.g., as shown in FIG. 13. The various components of filter interface assembly 270 lock filter cartridge 220, chute 404, and spring 402 in place, e.g., along the axial direction A. Accordingly, chute 404 is movable between a first position (FIG. 14) and a second position (FIG. 13) along the axial direction A.

Chute 404 defines an inlet passage 406 and an outlet passage 408. As shown in FIG. 14, when chute 404 is the first position, inlet passage 406 is not in fluid communication with inlet 212 of manifold 210 and outlet passage 408 is not in fluid communication with outlet 214 of manifold 210, and thus, water is shutoff from manifold 210. In contrast, as shown in FIG. 13, when chute 404 is the second position, inlet passage 406 is in fluid communication with inlet 212 of manifold 210 and outlet passage 408 is in fluid communication with outlet 214 of manifold 210, and thus, water is allowed to flow through manifold 210 and ultimately be filtered by filter media 232.

One exemplary manner in which a filter cartridge may be removed from a manifold will now be described. With reference still to FIGS. 6 through 10, first, filter cartridge 220 is twisted in a second twisting direction T2 along the circumferential direction C. As shown in FIG. 10, the second twisting direction T2 is a direction opposite first twisting direction T1. To separate the first magnetic member 280 from first magnet 300 and the second magnetic member 290 from the second magnet 302, the applied twisting force must overcome the magnetic attraction between first magnetic member 280 and first magnet 300 as well as the magnetic attraction between second magnetic member 290 and second magnet 302. Once the magnetic attractions between the magnetic members and the magnets is overcome, filter cartridge 220 is twisted along the second twisting direction T2 so that second portion 284 of first magnetic member 280 is axially aligned with opening 313 of first slot 310 and second portion 294 of second magnetic member 290 is axially aligned with opening 333 of second slot 330. That is, second portion 284 of first magnetic member 280 is moved out of recessed groove 314 of first slot 310 and is aligned with opening 313 along the axial direction A and second portion 294 of second magnetic member 290 is moved out of recessed groove 334 of second slot 330 and is aligned with opening 333 along the axial direction A when filter cartridge 220 is twisted along the second twisting direction T2, which is a direction along the circumferential direction C.

Thereafter, filter cartridge 220 is moved downward along the axial direction A, as denoted by the arrow D in FIG. 9, so that first magnetic member 280 is removed from first slot 310, second magnetic member 290 is removed from second slot 330, and neck 260 and sleeve 240 (FIG. 5) are removed from main chamber 211 of manifold 210. Consequently, filter cartridge 220 is removed from manifold 210 and may be serviced, replaced, etc.

Figure 12:
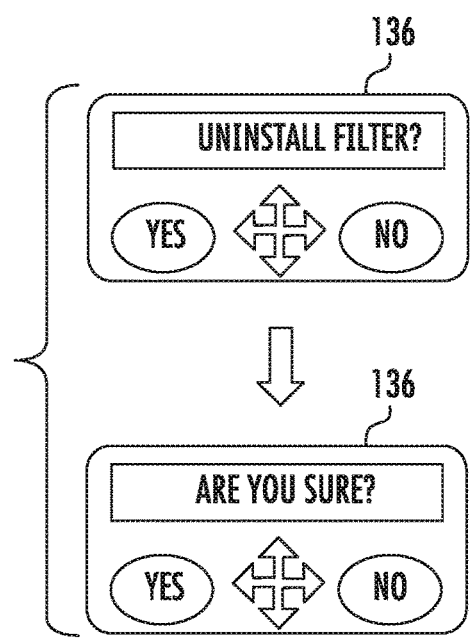
FIG. 12 provides a sequence flow chart of one exemplary method for ensuring safe removal of a filter cartridge from a manifold according to an exemplary embodiment of the present disclosure.

Prior to removal of filter cartridge 220 from manifold 210, the flow of water to manifold 210 is preferably shut off. As one example, as shown in FIG. 12, a user may use input selectors and display of user interface panel 136 to indicate that filter removal is desired. A user may select "Yes" when "Uninstall filter?" is prompted on the display of user interface panel 136. To confirm, the user may be prompted with a confirmation prompt "Are you sure?" The user may confirm by once again selecting "Yes." Once a user has communicated a desire to remove filter cartridge 220 from manifold 210 and confirmed such intent, controller 180 (FIG. 1) controls valve 216 (FIG. 3) to move to a closed position so that the flow of water is shut off to manifold 210 of water filter assembly 200. As such, filter cartridge 220 may be safely removed from manifold 210 (i.e., without pressurized water spilling out). In alternative exemplary embodiments, refrigerator appliance 100 or another appliance for which water filter assembly 200 provides filtering capability may include alternative mechanical features that shut off the water flow to manifold 210 to ensure safe mounting and removal of filter cartridge 220 to manifold 210. In yet other embodiments, manifold 210 may include mechanical features that selectively allow a flow of water to manifold 210, e.g., such as those mechanical features shown in FIGS. 13 and 14 and described in the accompanying text.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly, comprising:
 a manifold defining a first slot and a second slot, the first slot having an opening and a recessed groove and the second slot having an opening and a recessed groove;
 a first magnet disposed within the recessed groove of the first slot;
 a second magnet disposed within the recessed groove of the second slot;
 a filter cartridge removably mounted to the manifold and defining a chamber, the filter cartridge comprising a housing;
 a filter media disposed within the chamber;
 a first magnetic member extending from the housing, wherein when the filter cartridge is mounted to the manifold, the opening of the first slot receives the first magnetic member and the first magnetic member is attracted to the first magnet; and
 a second magnetic member extending from the housing, wherein when the filter cartridge is mounted to the manifold, the opening of the second slot receives the second magnetic member and the second magnetic member is attracted to the second magnet, wherein the water filter assembly defines an axial direction, a radial direction, and a circumferential direction, and wherein the recessed groove of the first slot has a rise surface extending in a plane along the axial direction and a run surface extending in a plane orthogonal to the axial direction, and wherein when the filter cartridge is mounted to the manifold, the second portion of the first magnetic member is seated on the run surface of the recessed groove of the first slot.

2. The water filter assembly of claim 1, wherein the manifold comprises a bottom wall, and wherein the bottom wall of the manifold defines the opening of the first slot and the opening of the second slot.

3. The water filter assembly of claim 1, wherein the water filter assembly defines an axial direction, a radial direction, and a circumferential direction, and wherein the first slot and the second slot each extend along and are spaced from one another along the circumferential direction.

4. The water filter assembly of claim 3, wherein the first slot and the second slot are spaced opposite from one another along the radial direction.

5. The water filter assembly of claim 3, wherein the first magnetic member extends between a proximal end and a distal end and comprises a first portion extending from the proximal end along the axial direction and a second portion extending from the first portion along a direction orthogonal to the axial direction to the distal end.

6. The water filter assembly of claim 5, wherein the first slot extends between a first end and a second end, and wherein the opening of the first slot is defined by the manifold at the first end and the recessed groove of the first slot extends from the second end to about a midline that is midway between the first end and the second end.

7. The water filter assembly of claim 5, wherein the first portion of the first magnetic member transitions to the second portion of the first magnetic member at a curved elbow.

8. The water filter assembly of claim 5, further comprising:
a protective sleeve wrapped around at least a portion of the second portion of the first magnetic member.

9. The water filter assembly of claim 1, wherein the first magnetic member and the second magnetic member are formed of a ferromagnetic material.

10. A water filter assembly defining an axial direction, a radial direction, and a circumferential direction extending about the axial direction, the water filter assembly comprising:
a manifold comprising a bottom wall and defining a first slot and a second slot each extending along the circumferential direction, the first slot spaced from the second slot along the circumferential direction, the first slot having an opening defined by the bottom wall and a recessed groove, the second slot having an opening defined by the bottom wall and a recessed groove;
a first magnet disposed within the recessed groove of the first slot;
a second magnet disposed within the recessed groove of the second slot;
a filter cartridge removably mounted to the manifold and defining a chamber, the filter cartridge comprising a housing;
a filter media disposed within the chamber;
a first magnetic member comprising a first portion and a second portion, the first portion extending from the housing along the axial direction and the second portion extending from the first portion along a direction substantially orthogonal to the axial direction, wherein when the filter cartridge is mounted to the manifold, the opening of the first slot receives the first magnetic member, the recessed groove of the first slot receives the second portion of the first magnetic member, and the first magnetic member is attracted to the first magnet;
a second magnetic member comprising a first portion and a second portion, the first portion extending from the housing along the axial direction and spaced from the first magnetic member along the circumferential direction, the second portion of the second magnetic member extending from the first portion of the second magnetic member along the direction substantially orthogonal to the axial direction, wherein when the filter cartridge is mounted to the manifold, the opening of the second slot receives the second magnetic member, the recessed groove of the second slot receives the second portion of the second magnetic member, and the second magnetic member is attracted to the first magnet, and wherein the recessed groove of the first slot has a rise surface extending in a plane along the axial direction and a run surface extending in a plane orthogonal to the axial direction, and wherein when the filter cartridge is mounted to the manifold, the second portion of the first magnetic member is seated on the run surface of the recessed groove of the first slot.

11. The water filter assembly of claim 10, wherein the second portion of the first magnetic member and the second portion of the second magnetic member extend from their respective first portions opposite one another in the direction substantially orthogonal to the axial direction.

12. The water filter assembly of claim 10, wherein the second portion of the first magnetic member is formed of a ferromagnetic material and the first portion of the first magnetic member is formed of an insulating material.

13. The water filter assembly of claim 10, wherein the first slot extends between a first end and a second end and the second slot extends between a first end and a second end, and wherein the opening of the first slot defined by the bottom wall of the manifold is at the first end of the first slot and the first magnet is disposed at the second end of the first slot and the opening of the second slot defined by the bottom wall of the manifold is at the first end of the second slot and the second magnet is disposed at the second end of the second slot.

14. The water filter assembly of claim 10, further comprising:
a first protective sleeve wrapped around at least a portion of the second portion of the first magnetic member; and
a second protective sleeve wrapped around at least a portion of the second portion of the second magnetic member, wherein the first protective sleeve and the second protective sleeve are both formed of an elastic material.

15. The water filter assembly of claim 10, wherein the manifold is mounted to a cabinet of an appliance.

16. The water filter assembly of claim 10, wherein the manifold defines an inlet, and outlet, and a main chamber, and wherein the water filter assembly further comprises:
a chute defining an inlet passage and an outlet passage, the chute movable within the main chamber between a first position and a second position, and wherein when the chute is in the first position, the inlet passage of the chute is not in fluid communication with the inlet and the outlet passage of the chute is not in fluid communication with the outlet, and wherein when the chute is in the second position, the inlet passage of the chute is in fluid communication with the inlet and the outlet passage of the chute is in fluid communication with the outlet.

17. The water filter assembly of claim 10, wherein the first magnetic member extends between a proximal end and a distal end and the second magnetic member extends between a proximal end and a distal end, and wherein the second portion of the first magnetic member extends from the first portion of the first magnetic member to the distal end of the first magnetic member along the circumferential direction and wherein the second portion of the second magnetic member extends from the first portion of the second magnetic member to the distal end of the second magnetic member along the circumferential direction.

* * * * *